US008260569B2

(12) United States Patent
Karassiouk

(10) Patent No.: US 8,260,569 B2
(45) Date of Patent: Sep. 4, 2012

(54) DETERMINING A DIMENSION OF A REGULAR PATTERN OF ELEMENTS

(75) Inventor: Valentine A. Karassiouk, Vancouver (CA)

(73) Assignee: Eastman Kodak Company, Rochester, NY (US)

( * ) Notice: Subject to any disclaimer, the term of this patent is extended or adjusted under 35 U.S.C. 154(b) by 398 days.

(21) Appl. No.: 12/609,113

(22) Filed: Oct. 30, 2009

(65) Prior Publication Data

US 2011/0106491 A1 May 5, 2011

(51) Int. Cl.
*G01B 7/00* (2006.01)
*G01B 15/00* (2006.01)

(52) U.S. Cl. ........................................ 702/155; 356/602

(58) Field of Classification Search .............. 702/75–77, 702/81, 83, 84, 93, 94, 104, 150–155; 347/8, 347/16, 86, 237, 238; 356/124.5, 217, 602, 356/635; 358/1.15, 1.9, 3.06, 406, 474, 488; 359/618; 360/17, 59, 71, 224; 382/106, 382/275; 384/112; 398/58

See application file for complete search history.

(56) References Cited

U.S. PATENT DOCUMENTS

| | | | | |
|---|---|---|---|---|
| 3,657,550 | A | 4/1972 | Brown et al. | |
| 3,937,580 | A | 2/1976 | Kasdan | |
| 5,600,432 | A | 2/1997 | Lengyel et al. | |
| 5,818,498 | A | 10/1998 | Richardson et al. | |
| 6,529,280 | B1 * | 3/2003 | Yahashi et al. ................ | 356/602 |
| 2009/0046896 | A1 | 2/2009 | Yamaguchi et al. | |

FOREIGN PATENT DOCUMENTS

| | | |
|---|---|---|
| EP | 2085741 | 9/2007 |

* cited by examiner

*Primary Examiner* — John H Le

(74) *Attorney, Agent, or Firm* — Nelson Adrian Blish

(57) ABSTRACT

A method for determining a dimension of a regular pattern of elements, wherein the elements in the regular pattern are arranged along an arrangement direction with a first spatial frequency includes providing a sensor for sampling the regular pattern; providing a plurality of data sample sets, wherein each data sample set includes data samples provided by the sensor while sampling over a portion of the regular pattern, and each data sample set consists of a different number of data samples; analyzing each data sample set to determine a corresponding spatial frequency; determining a plurality of quantified values, each quantified value being associated with a different one of the determined spatial frequencies; selecting a first quantified value from the plurality of quantified values; and determining the dimension based at least on the selected first quantified value.

35 Claims, 5 Drawing Sheets

DETERMINING A DIMENSION OF A REGULAR PATTERN OF ELEMENTS

CROSS REFERENCE TO RELATED APPLICATIONS

Reference is made to commonly-assigned U.S. patent application Ser. No. 12/503,099 (now U.S. Publication No. 2011/0012985), filed Jul. 15, 2009, entitled IMPROVED SETTING OF IMAGING PARAMETERS USING A SCANNER, by Dyck et al., the disclosure of which is incorporated herein.

FIELD OF THE INVENTION

The invention relates in general to determining a dimension of a regular pattern of elements and in particular, to determining the width of an image swath formed by a recording apparatus employed to form images on recording media.

BACKGROUND OF THE INVENTION

Various recording apparatus are used to form images on recording substrates. For example, images can be formed on a recording media by mounting the recording media on a support and operating a recording head comprising a plurality of marking elements to form the images on the media. In such systems, images can be formed by various processes. For example, the marking elements can be operable for emitting image forming radiation beams. In other examples, the marking elements can be operated to emit an image forming material onto a recording media to form an image. For example, in various inkjet applications marking elements are used to emit drops of image forming materials suitable for forming images on various recording media. Typically, these image forming material are in a fluid state. Inkjet processes can include continuous inkjet and drop-on-demand inkjet processes.

Various image features are formed on a recording media by combining image elements (i.e. also known as image pixels or dots) into arrangements representative of the features. Typically, each arrangement comprises a regular pattern of the image elements.

Increased productivity requirements have lead to the use of recording heads with ever increasing numbers of marking elements. Despite these larger numbers however, it still can be necessary to merge a plurality of sub-images to create a desired image in many applications. Merging sub-images without artifacts along their merged borders, or in regions where the sub-images may overlap, is desirable. Banding refers to an artifact that may appear as patterns of density variations. Typically, banding can occur in the regions where various sub-images are merged. Artifacts such as banding can be caused by placement errors of the image elements on the recording media or by visual characteristic variations among the image elements.

Various factors can adversely affect the placement requirements of the formed sub-images. One such factor is the actual size of each sub-image. A required positioning of one sub-image relative to another sub-image requires that various relevant dimensions of the sub-images be precisely determined to avoid undesired overlaps or gaps between the positioned sub-images.

There remains a need for effective and practical methods and systems that can be employed to accurately and efficiently determine various dimensions of regular patterns of elements. There remains a need for effective and practical methods and systems that can be employed to accurately and efficiently determine dimensions of various sub-images that are to be combined to form an image with desired visual quality attributes.

SUMMARY OF THE INVENTION

Briefly, according to one aspect of the present invention a method for determining a dimension of a regular pattern of elements, wherein the elements in the regular pattern are arranged along an arrangement direction with a first spatial frequency includes providing a sensor for sampling the regular pattern; providing a plurality of data sample sets, wherein each data sample set comprises data samples provided by the sensor while sampling over a portion of the regular pattern, and each data sample set consists of a different number of data samples; analyzing each data sample set to determine a corresponding spatial frequency; determining a plurality of quantified values, each quantified value being associated with a different one of the determined spatial frequencies; selecting a first quantified value from the plurality of quantified values; and determining the dimension based at least on the selected first quantified value.

The invention and its objects and advantages will become more apparent in the detailed description of the preferred embodiment presented below.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive sense.

Figure 1:
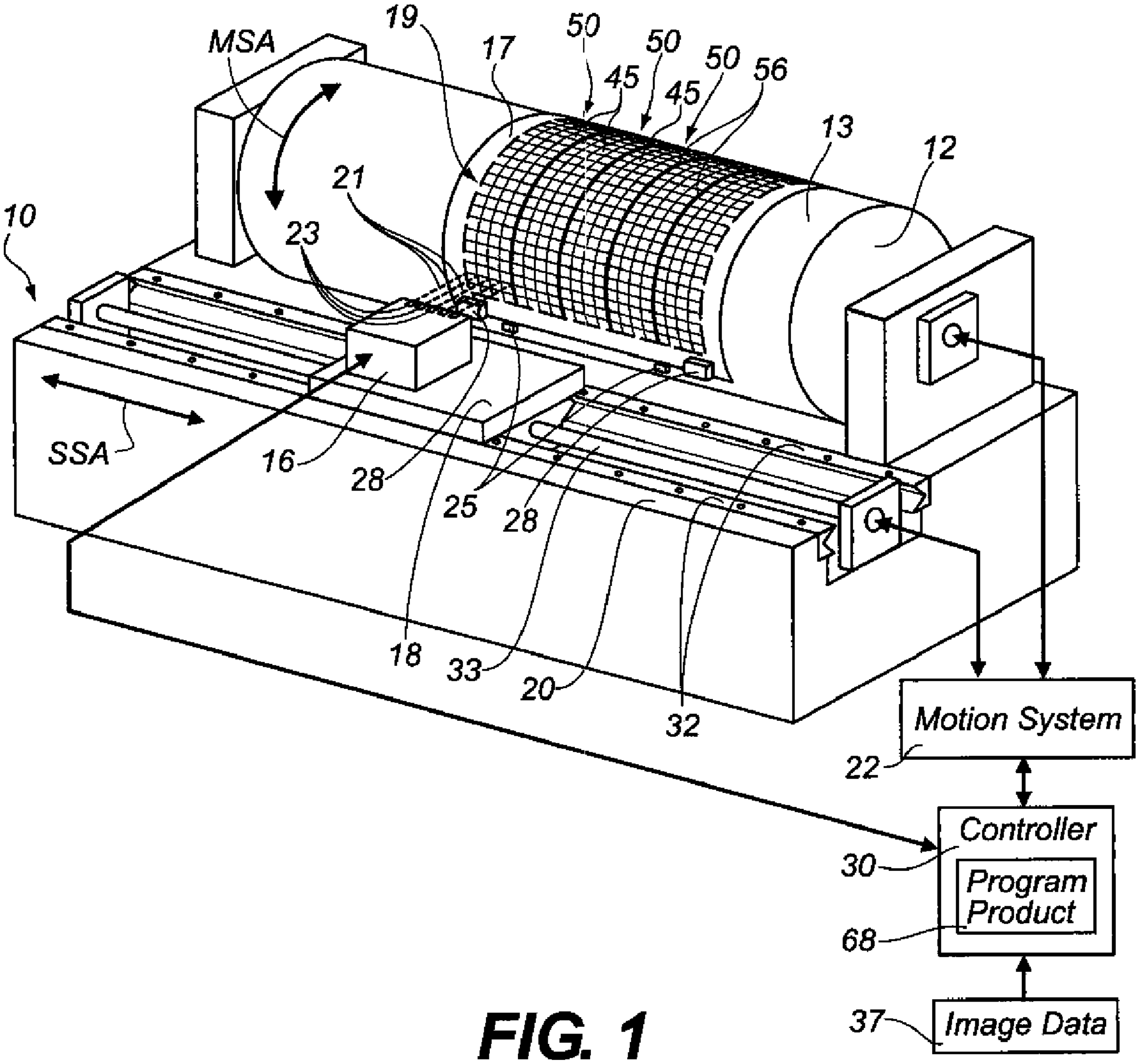
FIG. 1 is a schematic perspective view of a recording apparatus employed by an example embodiment of the invention.

FIG. 1 schematically shows a recording apparatus 10 for forming an image 19 (i.e. schematically represented by broken lines) on a recording media 17 as per an example embodiment of the invention. Recording media 17 can include various media comprising a surface suitable for forming image 19 thereupon. Recording apparatus 10 includes a media support 12, which in this example embodiment includes an external drum configuration. Other example embodiments of the invention can include other forms of media supports which can include internal drum configurations or flat surface configurations for example.

In this example embodiment, recording media 17 is supported on a cylindrical surface 13 of media support 12. One or more portions of recording media 17 are secured to cylindrical surface 13 by clamps 28. In other example embodiments, recording media 17 can be secured to media support 12 by additional or alternative methods. For example, a surface of recording media 17 can be secured to cylindrical surface 13 by various methods including providing a low pressure source (e.g. suction) between the surfaces. In various example embodiments, media support 12 is moveably coupled to support 20. In this example embodiment, media support 12 is rotationally coupled to support 20. In this example embodiment, media support 12 includes a plurality of registration features 25. Registration features 25 are employed to orient recording media 17 with respect to media support 12 in a desired orientation.

Recording apparatus 10 includes recording head 16 which is movable with respect to media support 12 in this example embodiment. In this example embodiment of the invention, media support 12 is adapted to move by rotating about its rotational axis. In this example embodiment, recording head 16 is mounted on movable carriage 18. Carriage 18 is operated to cause recording head 16 to be moved along a path aligned with the rotational axis of media support 12. Motion system 22 (which can include one or more motion systems) can include any suitable drives needed for the required movement. Motion, system 22 is used to provide relative movement between recording head 16 and media support 12. In this example embodiment of the invention, motion system 22 is used to move media support 12 along a path aligned with main-scan axis MSA and is used to move recording head 16 along a path aligned with sub-scan axis SSA. Guide system 32 is used to guide carriage 18 which is moved under the influence of transmission member 33. In this example embodiment of the invention, transmission member 33 includes a precision screw mechanism. In some example embodiments, several recording heads 16 are moved in a manner in which each of the recording heads 16 is moved independently of one another. In some example embodiments, several recording heads 16 are moved in tandem.

Those skilled in the art will realize that various forms of relative movement between recording head 16 and media support 12 can be used in accordance with the present invention. For example, in some cases recording head 16 can be stationary while media support 12 is moved. In other cases, media support 12 is stationary and recording head 16 is moved. In still other cases, both recording head 16 and media support 12 are moved. One or both of recording head 16 and media support 12 can reciprocate along corresponding paths. Separate motion systems can also be used to operate different systems within recording apparatus 10.

Controller 30, which can include one or more controllers, is used to control one or more systems of recording apparatus 10 including, but not limited to the motion system 22 used by media support 12 and carriage 18. Controller 30 can also control media handling mechanisms that can initiate the loading or unloading of recording media 17 to, or from media support 12. Controller 30 can also control recording head 16 to form image 19 in accordance with image data 37. Various systems can be controlled using various control signals and by implementing various methods. Controller 30 is programmable and can be configured to execute suitable software and can include one or more data processors, together with suitable hardware, including by way of non-limiting example: accessible memory, logic circuitry, drivers, amplifiers, A/D and D/A converters, input/output ports, and the like. Controller 30 can comprise, without limitation, a microprocessor, a computer-on-a-chip, the CPU of a computer, or any other suitable microcontroller. Controller 30 can consist of one ore more logical units, each of which is dedicated to performing a particular task in accordance with one or more various example embodiments of the invention.

Recording head 16 includes plurality of marking elements 23 which can be arranged in various configurations including various array configurations. An array of marking elements 23 can include a one-dimensional or a two-dimensional array of the marking elements. In this regard, marking elements 23 are arranged according to a regular pattern as defined by the array.

Each of the marking elements 23 is controllable to form an image element 45 on recording media 17 in accordance with image information provided by image data 37. As used herein, image element 45 refers to a single unit element of image that can be formed on recording media 17, and is also known in the image-forming arts as an "image pixel" or "dot." In the present invention, various image elements 45 can be combined with other image elements 45 to form various features of image 17. Image elements 45 can be combined to form various patterns of image elements 45 including halftone patterns, stochastic patterns and hybrid patterns (i.e. patterns that include halftone and stochastic patterns). Halftone patterns are an example where the image elements 45 are arranged in regular patterns.

Marking elements 23 can be controlled to form images on recording media 17 by different methods. For example, in various inkjet applications, marking elements 23 can include various nozzle structures that are operable for emitting drops of image forming material onto a surface of recording media 17. Image forming materials can include colorants, dye-based compositions, pigment-based compositions, photo-sensitive compositions and thermo-sensitive compositions, for example.

In this illustrated embodiment, marking elements 23 are controlled to emit radiation beams 21 to form corresponding image elements 45. Radiation beams 21 can be emitted by various methods. For example, in this illustrated embodiment recording head 16 includes a radiation source such as a laser (not shown) which directs radiation onto a spatial light modulator (also not shown). Various elements of the spatial light modulator are selectively controlled to transform the radiation into a plurality of radiation beams 21. Various optical elements (not shown) project the radiation beams onto recording media 17 to form corresponding image elements 45.

Radiation beams 21 can be used to form image 19 on recording media 17 by different methods. For example, radiation beams 21 can be used to image-wise ablate a surface of recording media 17. Radiation beams 21 can be used to cause an image-wise transference of an image-forming material from a donor element to a surface of recording media 17 (e.g. a thermal transfer process). Recording media 17 can include an image modifiable surface, wherein a property or characteristic of the modifiable surface is changed when irradiated by a radiation beam 21 emitted by a marking element 23. A radiation beam 21 can undergo a direct path from a radiation source to recording media 17 or can be deflected by one or more optical elements towards the recording media 17.

In many cases, the number of marking elements 23 is insufficient to completely form image 19 during a single marking operation. Accordingly, image 19 is formed by stitching or merging multiple sub-images together, each of the sub-images being formed during a corresponding marking operation. As shown in FIG. 1, image elements 45 are regularly arranged in each of a plurality of sub-images 50. Various ones of the sub-images 50 are merged with adjacent sub-images 50 at one of a plurality of merge lines 56. In this illustrated embodiment of the invention, each of the merge lines 56 extends primarily along a direction of main-scan axis MSA (i.e. a main-scan direction) and the merge lines 56 are arranged along a direction that is aligned with sub-scan axis SSA (i.e. a sub-scan direction).

Sub-images 50 can be formed in different manners. For example, image 19 can be formed from a plurality of markings referred to as "shots." During each shot, recording head 16 is positioned relative to a region of recording media 17. Once positioned, recording head is activated to form an arrangement of image elements 45 on the region of the recording media 17. Once the arrangement of image elements 45 is formed, relative movement between recording head 16 and recording media 17 is effected to position recording head 16 in the vicinity of an adjacent region and another shot is taken to form a next arrangement of image elements 45.

The various sub-images 50 can also be formed by scanning. In some example embodiments of the invention, scanning can be performed by deflecting radiation beams 21 relative to recording media 17. In some example embodiments, scanning can include establishing relative movement between recording head 16 and recording media 17 as recording head 16 is activated to form corresponding image elements 45. In these example embodiments, columns of image elements 45 are formed along a scan direction as relative movement between recording head 16 and recording media 17 is established. Relative movement can include moving one or both of recording head 16 and record media 17. Each of the scanned columns of image elements 45 are combined to form a sub-image 50 typically referred to as an image swath.

Different scanning techniques can be employed to form image swaths. For example, "circular" scanning techniques can be used to form "ring-like" or "circular" image swaths. A circular image swath can be formed when controller 30 causes recording head 16 to emit radiation beams 21 while maintaining recording head 16 at a first position along sub-scan axis SSA and while moving media support 12 along a direction of main-scan axis MSA. In this regard, scanning occurs solely along a main-scan direction. After the completion of a first circular image swath, recording head 16 is moved to a second position along sub-scan axis SSA. A second circular image swath is then formed as recording head 16 is operated to emit radiation beams 21 while maintaining recording head 16 at the second position and while moving media support 12 along a direction of main-scan axis MSA.

Helical scanning techniques can be employed to form helical image swaths which are formed in a spiral or helical fashion over a surface of recording media 17. For example, helical image swaths can be formed when controller 30 causes recording head 16 to emit radiation beams 21 while simultaneously causing recording head 16 to move along a direction of sub-scan axis SSA and media support 12 to move along a direction of main-scan axis MSA. In this regard, the scanning is "skewed" and occurs both along a main-scan direction and along a sub-scan direction and each helical image swath comprises an orientation that is skewed relative to main-scan axis MSA.

It is to be noted that other forms of skewed scanning techniques similar to helical scanning techniques can be used in various example embodiments of the invention. Skewed scanning techniques need not be limited to external drum configurations but can also be employed with other configurations of recording apparatus. For example, in some internal drum recording apparatus, media is positioned on a concave surface of a media support while a radiation beam is directed towards an optical deflector positioned along a central axis of the media support. The optical deflector is rotated while moving along central axis to cause the radiation beam to follow a spiral path on the surface of the media. Flat-bed recording devices can include coordinated movement between various marking elements and a media to form various image swaths with a particular desired orientation.

Combining various sub-images 50 to form an image 19 on recording media 17 with good visual quality typically requires that the sub-images 50 be correctly positioned on recording media 17. In some example embodiments of the invention, a correct positioning requires that two sub-images 50 be merged at merge line 56 such that a boundary of each of the two sub-images 50 falls on the merge line 56. In some example embodiments, it is desired that two sub-images 50 be merged at a merge line 56 such that very little or no overlap is created between the two sub-images 50. In other example embodiments, it is desired that two sub-images 50 be merged at a merge line 56 such that the two sub-images 50 overlap one another by a desired amount. For example, commonly assigned U.S. Pat. No. 5,818,498 (Richardson et al.), which is herein incorporated by reference, discloses a method for merging a plurality of sub-images 50. Richardson et al. discloses forming a first sub-image 50 including a first column of image elements 45 formed in accordance with first image data 37. Second image data 37 assigned for the formation of a second sub-image 50 is modified to include the first image data 37 and a second column of image elements 45 in the second sub-image 50 is formed in accordance with the first image data 37 in the modified second image data 37. The second sub-image 50 is formed such that each image element 45 in the second column of image elements 45 overlaps and registers with a corresponding image element 45 in the previously formed first column of image elements 45. In this regard, these image elements 45 are written a plurality of times with the same image data 37.

Accordingly, in various example embodiments of the invention, it is desired that a plurality of sub-images 50 be merged at a merge line 56 that corresponds to a boundary of at least one of the merged sub-images 50. In other example embodiments, it is desired that the plurality of sub-images 50 be merged such that the merge line 56 corresponds to a boundary of one of the merged sub-images 50 while another of the plurality of sub-images 50 is positioned to overlap the boundary.

The merging a plurality of sub-images 50 at a particular merge line 56 requires an accurate determination of various dimensions of the sub-images. For example, when image 19 is fanned by forming a plurality of "shots" the correct positioning of recording head 16 between successively formed shots is dependant on a size of the sub-image 50 formed during a first one of the shots. A similar situation arises when each sub-image 50 is formed during a circular scan over recording media 17. If helical scanning techniques are employed, the amount of sub-scan movement that recording head 16 undergoes during the formation of a first helical image swath is typically related to a sub-scan size of the image swath and is tailored to accommodate a desired positioning of next image swath.

Figure 2:
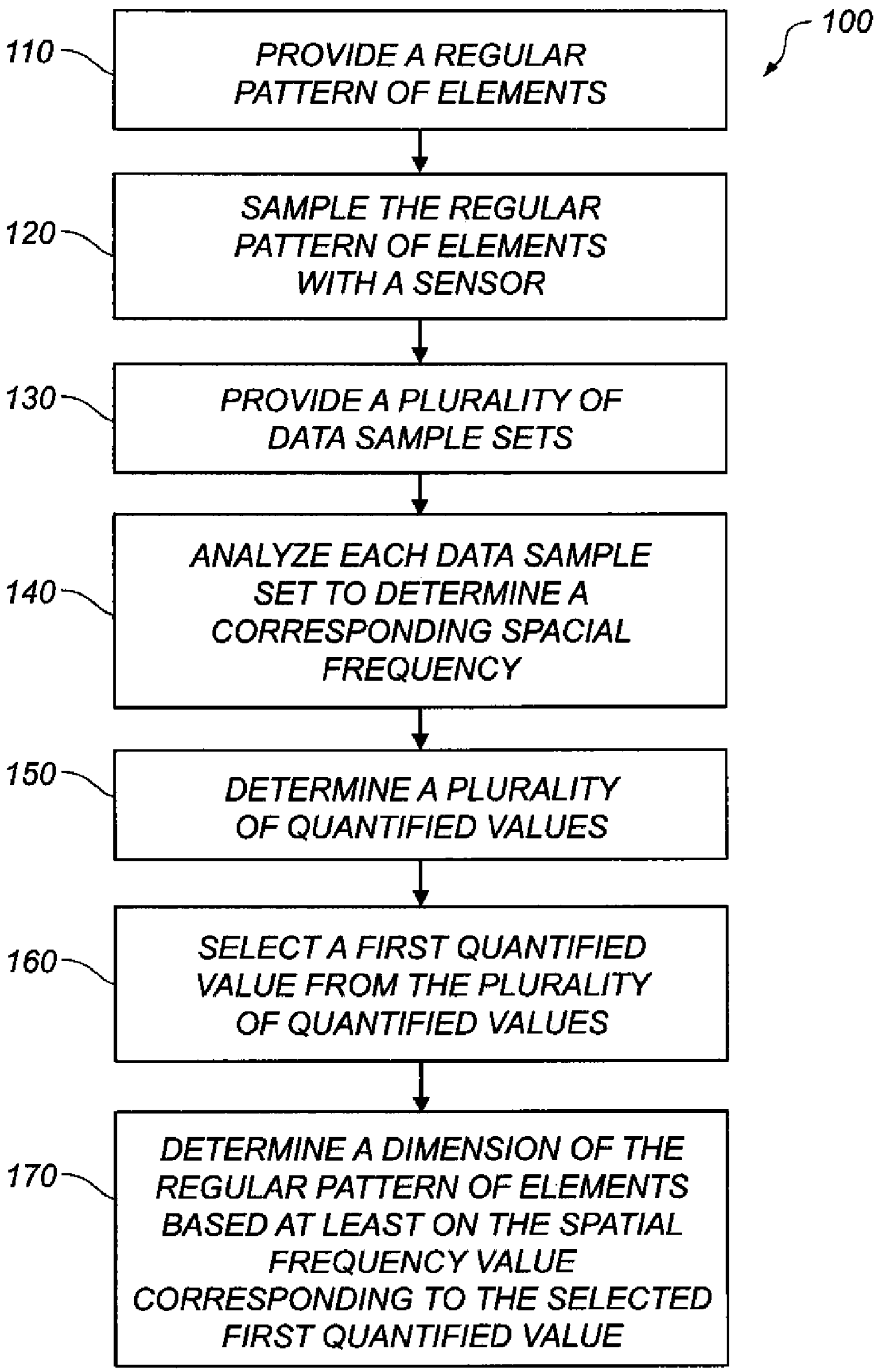
FIG. 2 shows a flow chart representative of a method for determining a dimension of a regular pattern of elements according to an example embodiment of the invention.

FIG. 2 shows a flow chart representative of a method 100 for determining a dimension of a regular pattern of elements according to an example embodiment of the invention. In step 110, the regular pattern of elements is provided. In the present invention, the elements in the regular pattern are arranged along an arrangement direction of the pattern with a first spatial frequency. More often than not however, the true values of various dimensions of the pattern such as the spatial pitch of the elements along an arrangement direction or a size attribute of the pattern are not known. Process variations can lead to deviations in various expected dimensions of a sub-image 50 thereby necessitating an accurate measurement or determination of various dimensions of the sub-image 50. For example, although an imaging resolution associated with recording apparatus 10 may be expressed in nominal units of dots per inch or dots per millimeter, actual minor variations associated with the radiation beams 21 emitted or the image elements 45 formed can lead to variations in the nominal dimensions of a sub-image 50 formed in accordance with the imaging resolution. Even minor variations can lead to the formation of an undesired gap or an undesired amount of overlap between two merged sub-images 50.

Figure 3:
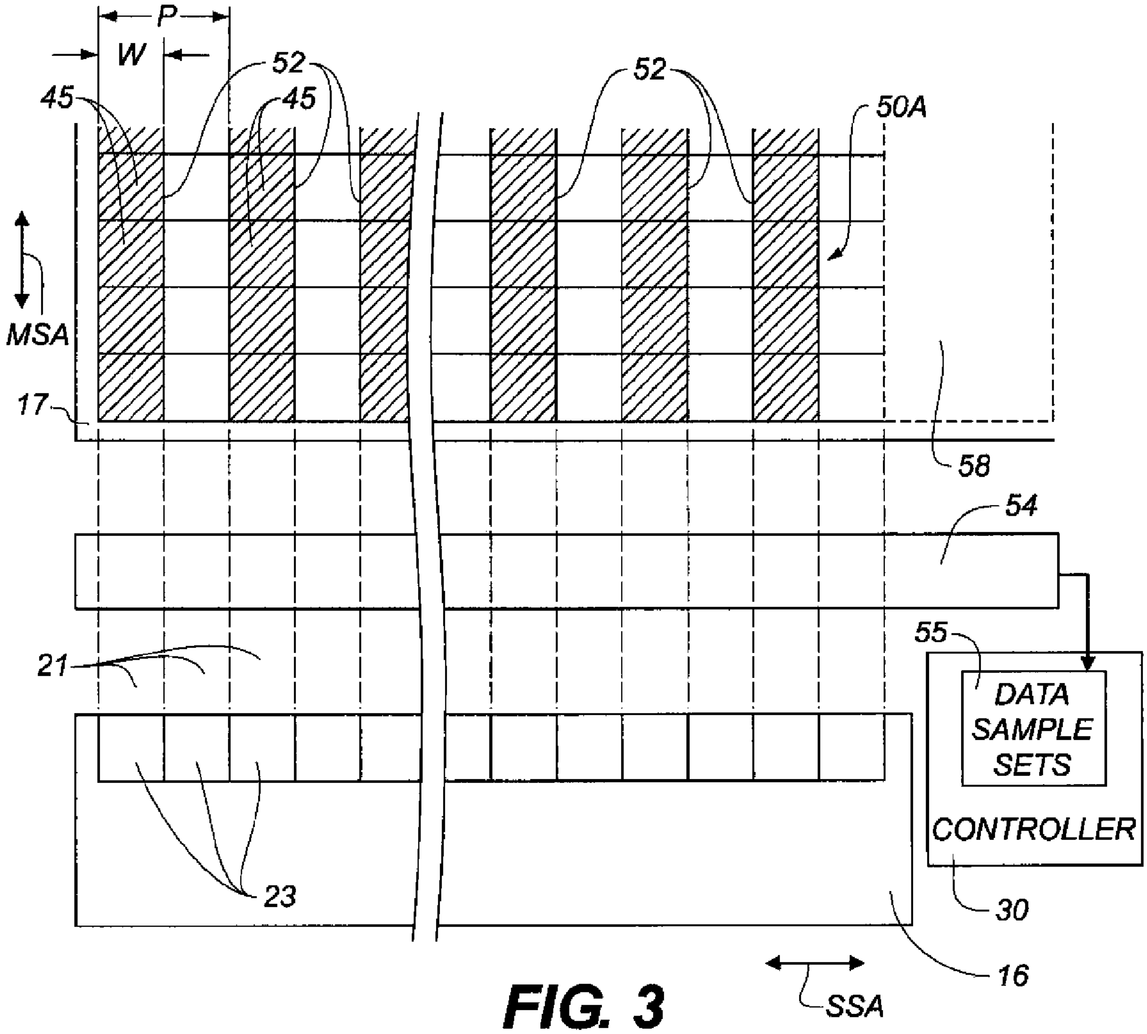
FIG. 3 schematically shows a sub-image comprising a regular pattern of elements.

In some example embodiments of the invention, the regular pattern is formed such that the elements are provided on a surface. For example, FIG. 3 schematically shows a sub-image 50A that can be formed on a surface of recording media 17. Sub-image 50A includes a regular pattern of elements that in this case consist of a pattern of image element columns 52, each of the image element columns 52 extending along a direction aligned with main-scan axis MSA. It is understood that each of the image element columns 52 can extend along other directions in other example embodiments.

In this example embodiment, each image element column 52 consists of an uninterrupted column of image elements 45. Each of the image element columns 52 has a size W corresponding to a sub-scan width of a single image element 45. The image element columns 52 repeat along the sub-scan direction with a spatial period or pitch P corresponding to a sub-scan width of two (2) combined image elements 45. In other example embodiments, the repeating pattern of elements can take other forms. For example, the image elements 45 can be arranged in a different manner to form a pattern feature that repeats along an arrangement direction of the pattern with a different spatial period than that shown in FIG. 3. It is further understood that the image elements 45 can be arranged to form pattern features having a different shape or form than that illustrated in FIG. 3. It is further understood that the image elements 45 can be arranged to form pattern features having a different size along an arrangement direction of the pattern than that which is illustrated in FIG. 3. In other example embodiments of the invention, the elements in a regular pattern need not be formed with image elements 45.

In this example embodiment, each of the image element columns 52 is formed by scanning radiation beams 21 provided by recording head 16 over recording media 17. Various marking elements 23 in recording head 16 are selectively controlled to arrange the radiation beams 21 in a configuration suitable for forming the pattern of image element columns 52. In this regard, the recording beams 21 also form a regular pattern of elements.

In step 120 the regular pattern of elements is sampled with a sensor 54. In various example embodiments, sensor 54 is operated to provide a plurality of data samples while performing at least one sampling over a portion of the regular pattern. In some example embodiments the portion of the regular pattern that is sampled by sensor 54 is less than the entirety of the regular pattern. In some example embodiments the portion of the regular pattern that is sampled by sensor 54 is equal to the entirety of the regular pattern. In some example embodiments, sensor 54 is operated to additionally sample a region that excludes the regular pattern. The region that excludes the regular pattern can include a region 58 (i.e. schematically shown in broken lines) that is adjacent to the regular pattern by way of non-limiting example.

The type of sensor 54 that is employed in various example embodiments of the invention can be motivated by various characteristics of the regular pattern that is to be sampled. In some example embodiments, a sensor 54 that is suitable for sampling a regular pattern formed on a surface is employed. For example, a scanning image sensor (not shown) can be used to detect the regular pattern of image element columns 52 formed on a surface of recording media 17. Scanning image sensors typically employ various image capture sensors to scan an image and generate data representing a portion of the image that was scanned. Present day scanners typically employ a charge coupled device (CCD) or a contact image sensor (CIS) as the image capture sensor. A typical CCD-type scanner has at least one row of photo-elements for detecting the light intensity of various samples of an image that is to be scanned. The scanning resolution of a scanner is typically measured in dots per inch (DPI) which can vary from scanner to scanner. In many flatbed scanners, the resolution is determined by the number of sensors in a row of the sensors (i.e. typically referred to the X direction scanning rate) and by the sampling rate of the array along a scanning direction of the scanner (i.e. typically referred to as the Y direction scanning rate). For example, if the resolution is 300 DPI×300 DPI for a scanner that is capable of scanning a letter-sized entity, then the scanner would typically employ at least one row made up of 2550 sensors (i.e. 300 DPI*8.5 inches) and would employ a drive suitable for conveying the sensor array in increments of $1/300^{th}$ of an inch (i.e. the sampling spatial period) to produce the sampling spatial frequency of 300 cycles per inch. In some example embodiments, sampling is performed after additional process steps are taken to enhance a contrast between the elements and regions of the surface that border the elements.

Figure 4:
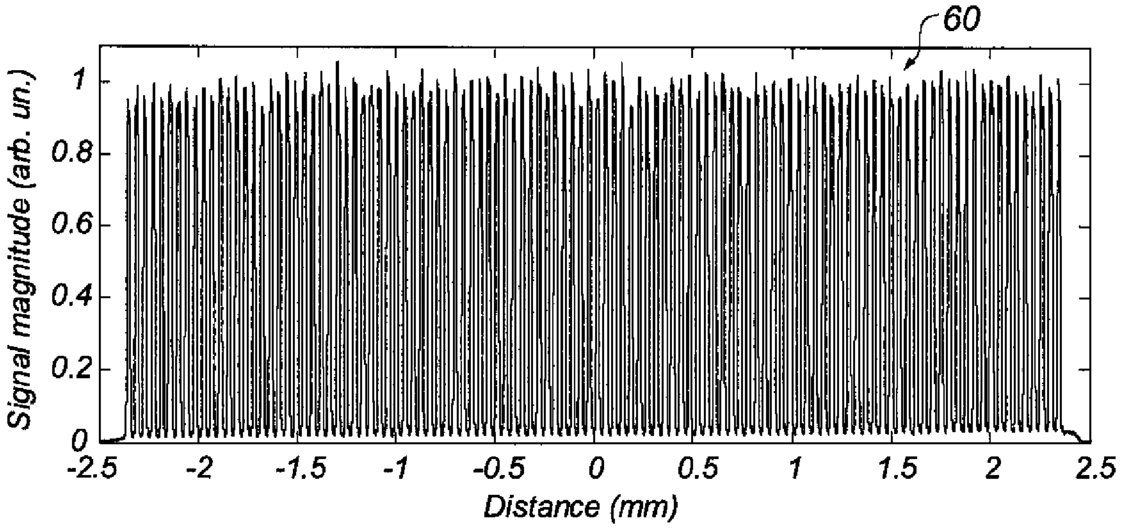
FIG. 4 shows an intensity profile of a regular pattern of radiation beams.

In this example embodiment, the regular pattern of elements that is sampled is the pattern of radiation beams 21 that are provided by recording head 16. As schematically shown in FIG. 3, sensor 54 is provided for sampling radiation provided by various marking elements 23. Sensor 54 can include various sensors including various photo-sensors for example. In this example embodiment, sensor 54 is selected to determine a spatial distribution of intensity values (i.e. an intensity profile) corresponding to the radiation beams 21 provided by recording head 16. For example, FIG. 4 shows an intensity profile 60 of a regular pattern of radiation beams arranged in a manner similar to that shown in FIG. 3. In this case, the intensity profile 60 corresponds to radiation pattern that is produced by operating the marking elements 23 in a recording head 16 in a repeating "one-ON, one-OFF" manner. The signal magnitude is expressed in arbitrary units.

Sensors 54 suitable for sampling a regular pattern of radiation can include beam profilers. Beam profilers are diagnostic devices that can provide intensity profile information of a sampled radiation. Beam profilers can be used to accurately determine detailed intensity profile information of a plurality of radiation beams. Various forms of beam profilers are known in the art. Multi-photosensor based beam profilers typically employ a plurality of visible or near-infrared CCD or CMOS sensors. Multi-photosensor beam profilers are relatively economical and can be operated in real time. Another category of beam profilers includes scanning beam profilers. Scanning beam profilers typically employ a moving spatial sampling element such as a knife edge, slit or pinhole and a meter to provide data samples representative of the intensity profile of a sampled radiation. Scanning beam profilers typically comprise relatively high sampling spatial frequencies.

In some example embodiments, sensor 54 is part of recording head 16. In some example embodiments, sensor 54 is not part of recording apparatus 10. For example, sensor 54 can be part of a stand-alone calibration system that can be used to calibrate recording head 16 as located within recording apparatus 10 or as removed from recording apparatus 10. In some example embodiments, sensor 54 can be positioned at a location on support 20 that can be irradiated by radiation beams 21. Sensor 54 can also be positioned at other locations such as movable media support 12, but additional communications complications between sensor 54 and controller 30 may need to be addressed in this configuration.

In this illustrated embodiment, sensor 54 positioned at a sampling position which intersects a path of travel of radiation beams 21. In some example embodiments, radiation provided by a radiation source within recording head 16 is detected when recording head 16 is not employed to form an image 19 on recording media 17. Controller 30 can be programmed to operate sensor 54 on a predetermined schedule. Additionally, or alternatively, sensor 54 can be operated to sample a regular pattern of elements in an "on-demand" fashion as requested by an operator via a suitable user interface.

Once positioned in the sampling position, sensor 54 samples the regular pattern of radiation beams 21. Sensor 54 can be physically removed from the optical path once the measurement is taken. In some example embodiments, sensor 54 need not detect the entirety of each radiation beam 21 that is provided by recording head 16. For example, a beam splitter (not shown) can be employed to provide a predetermined portion of each radiation beam 21 to sensor 54 while allowing remaining portions of each radiation beam 21 to travel along other paths. Those skilled in the art will realize that the present invention can employ various methods to direct patterns of radiation beams 21 to sensor 54.

Figure 5:
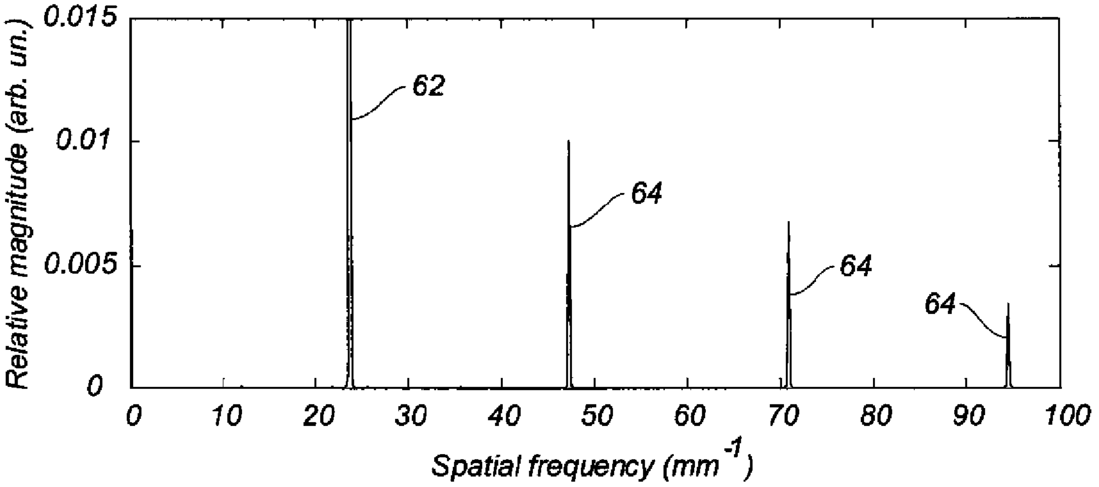
FIG. 5 shows a frequency spectrum derived for the intensity profile shown in FIG. 4.

Determining a particular dimension of a sub-image 50 can be a difficult and time consuming process, especially when direct measurement techniques employing high precision instruments are employed. For example, time consuming and complicated direct measurement techniques involving the use of scanning electron microscopes are required in lithographic processes employed to form various semiconductor devices. In various example embodiments of the present invention, the determination of a particular dimension of a regular pattern of elements is determined by operating sensor 54 to sample the regular pattern and analyzing data samples provided by sensor 54 in the frequency domain. For example, the regular pattern of radiation beams 21 shown in FIG. 3 can be analyzed in the frequency domain in accordance with various example embodiments of the present invention to determine a fundamental frequency and/or various harmonics associated with the spatial distribution of the radiation beams 21. FIG. 5 shows a frequency spectrum derived for the intensity profile illustrated in FIG. 4. The frequency spectrum shown in FIG. 5 includes a fundamental frequency peak 62 and various peaks 64 corresponding to harmonics thereof. The fundamental frequency peak 62 and the various harmonic peaks 64 have magnitudes that are shown in arbitrary units.

Various dimensions are associated with the regular pattern of radiation beams 21 employed to generate the analyzed intensity profile 60. For example, the spatial period (i.e. also referred to as the spatial pitch) of the radiation beams 21 can be found from the inverse of the spatial frequency that corresponds to the maximum magnitude value of the fundamental frequency peak 62. It is to be noted that the maximum magnitude value is not shown in FIG. 5 as its value exceeds the illustrated scale of the graph. Since the intensity profile was generated by a repeating pattern of one-ON, one-OFF radiation beams 21, a size of each radiation beams 21 can also be related to the determined spatial period. Further, since the total number of radiation beams 21 that can be employed in a given marking operation is known, one can determine a size of an associated sub-image 50. For example, a sub-scan width of an image swath can be readily determined on the basis of a determined spatial period of the radiation beams 21 in the regular pattern and the total number of the spatial periods that are required to make up the image swath. A sub-scan width of an image swath can be determined on the basis of a determined size of the radiation beams 21 and the total number of radiation beams 21 that are employed to make up the image swath.

Various problems are associated with analyzing an element corresponding to a specific frequency in the frequency domain. The sampling frequency of sensor 54 has a significant effect on a subsequent analysis of the data samples in the frequency domain. The total number of data samples employed to produce a frequency spectrum representative of the regular pattern has a significant effect on a subsequent analysis of the frequency spectrum. The data samples analyzed in the frequency domain are finite and therefore are separated into finite frequency bins. If a particular targeted frequency fits perfectly into a bin it, a frequency value comprising a maximum magnitude will be generated. If the targeted frequency is not so aligned, deviations in the strength of the magnitude will arise. Additionally, noise is created in the frequency spectrum when a periodic signal is cut part way through. Therefore, analyzing a regular pattern of elements in the frequency domain to determine various dimension of the pattern on the basis of discrete data samples provided by sensor 54 can lead to various erroneous results. The present invention reduces these erroneous results.

In step 130, a plurality of data sample sets 55 is provided. In various example embodiments, each data sample set 55 comprises data samples provided by sensor 54 while sampling over a portion of the regular pattern. In various example embodiments, a sampling may be characterized by action undertaken to cause sensor 54 to provide a sequence of data samples, the sequence of data sample representing an attribute of a sampled portion of the regular pattern. The sequence of data sample can be provided by scanning for example.

In one example embodiment, sensor 54 is operated to perform multiple samplings of a portion of the regular pattern. Each data sample set 55 is provided with data samples selected from a single one of the samplings such that each data sample set 55 is associated with a different one of the samplings. In some example embodiments, a different number of data samples are taken during each of the multiple samplings.

In some example embodiments, each of the data sample sets 55 comprises data samples selected from a first plurality of data samples provided by sensor 54 during a single sampling of a portion of the regular pattern. In many cases, efficiencies in the practice of the present invention can be achieved by adopting as few as possible separate samplings of the regular pattern. In some example embodiments of the invention, each of at least one of the data sample sets 55 comprises a portion of a first plurality of data samples provided by the sensor during a single sampling, the portion being less than the total of the first plurality of data samples. In some example embodiments, at least two of the data samples sets 55 each comprise a different number of data samples that are selected from a first plurality of data samples provided by the sensor during a single sampling. In some example embodiments of the invention, at least one of the data samples sets 55 comprises one or more samples provided by the sensor 54 while sampling a region that excludes the regular pattern (e.g. region 58).

In some example embodiments, a first data sample set 55 within the plurality of data sample sets 55 is provided by adding additional data to data samples selected from a first plurality of data samples provided by sensor 54 during a single sampling. In some example embodiments, a particular data sample within the first plurality of data samples is identified and the additional data is selected to be identical to the identified data sample. For example, the identified data sample can correspond to a background region that surrounds an element in the regular pattern. A background region can include a region between two adjacent elements in the regular pattern by way of non-limiting example. In some example embodiments, the identified data sample is a first data sample or last data sample taken by sensor 54 while sampling over the regular pattern of elements.

In accordance with various aspects of the present invention, the plurality of data sample sets 55 is provided in a manner where each data sample set 55 consists of a different number of data samples. Accordingly, the number of data samples in each of the data sample sets 55 is selected or modified to cause each of the data sample sets 55 to consist of a different number of data samples.

In step 140 each of the data samples sets 55 is analyzed to determine a corresponding spatial frequency. In this example embodiment, each of the data sample sets 55 is analyzed in the frequency domain to determine a corresponding spatial frequency value representative of the first spatial frequency with which the radiation beams 21 were arranged in the regular pattern. In some example embodiments, a Fourier algorithm such as Fourier Series is employed to analyze each of the data sample sets 55 in the frequency domain. In other example embodiments, each data sample set 55 can be analyzed in the frequency domain in accordance with other algorithms.

Figure 6:
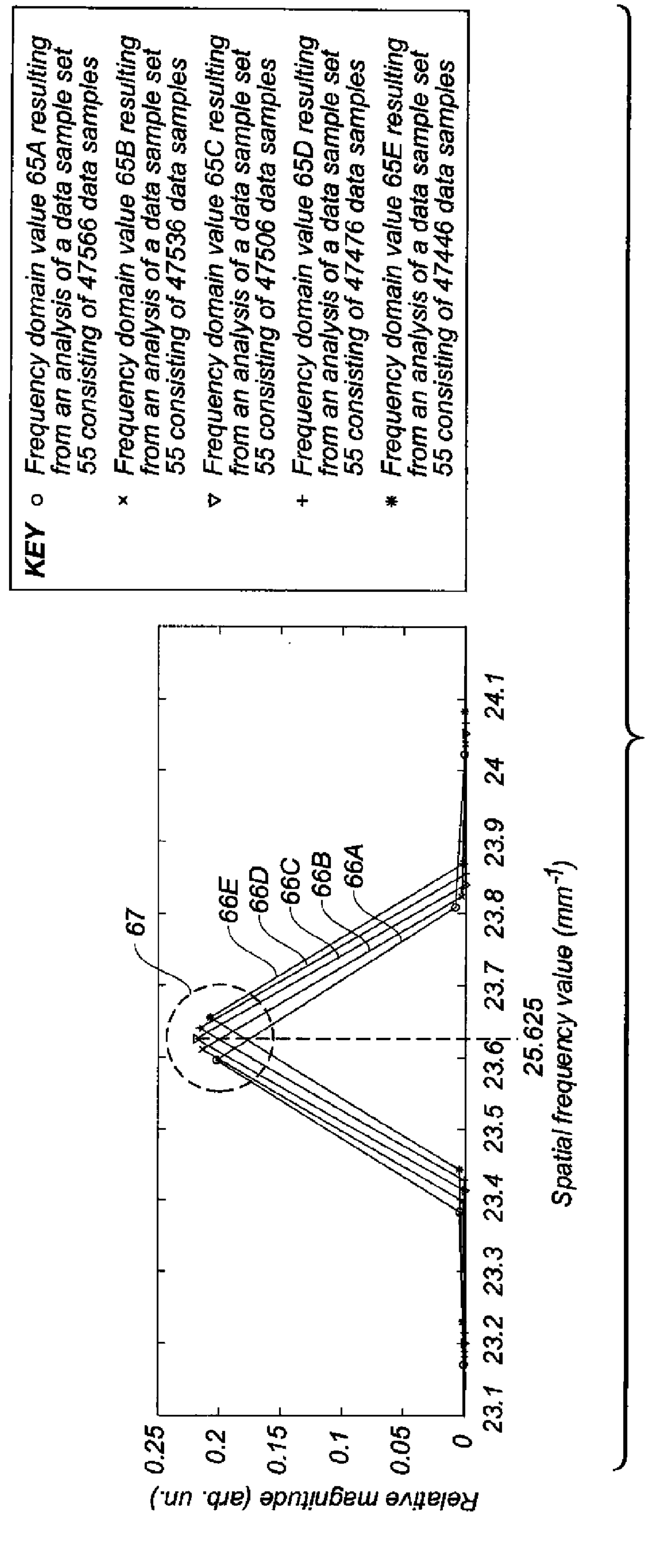
FIG. 6 shows a graph showing a distribution of frequency domain values associated with various data sample sets that were analyzed in accordance with an example embodiment of the invention.

FIG. 6 shows a graph showing a distribution of frequency domain values associated with each of five (5) data sample sets 55 that were analyzed in accordance with an example embodiment of the invention. This number of analyzed data sample sets 55 has been selected for clarity and other suitable numbers of data samples sets 55 are within the scope of the present invention. As shown in the KEY of FIG. 6, each distribution of frequency domain values correspond to a different data sample set 55, wherein each data sample set 55 consists of a different number of data samples. In particular, a set of frequency domain values 65A corresponds to a data sample set 55 consisting of 47566 data samples, a set of frequency domain values 65B corresponds to a data sample set 55 consisting of 47536 data samples, a set of frequency domain values 65C corresponds to a data sample set 55 consisting of 47506 data samples, a set of frequency domain values 65D corresponds to a data sample set 55 consisting of 47476 data samples, and a set of frequency domain values 65E corresponds to a data sample set 55 consisting of 47446 data samples. For clarity each of the frequency domain values 65 corresponding to a particular one of the of the data sample sets 55 is identified by a different symbol as highlighted in the FIG. 6 KEY. In this example embodiment, each of the frequency domain values 65 is characterized by a magnitude expressed in arbitrary units and a spatial frequency value expressed in units of $mm^{-1}$.

In this example embodiment, each of the frequency domain values corresponding to a particular one of the five (5) data sample sets 55 are points associated with one of five (5) fundamental frequency peaks 66A, 66B, 66C, 66D, and 66E (i.e. collectively referred to as fundamental frequency peaks). It is understood that each fundamental frequency peak is shown somewhat distorted since only a select number of frequency domain values have been joined together to define each fundamental frequency peak. In this example embodiment, the frequency domain values used to define each fundamental frequency peak were determined by analyzing an associated one of the five (5) data sample sets 55 using a Fourier algorithm. In other example embodiments, other spatial frequencies such as various harmonics of each fundamental frequency can be analyzed. In this example embodiment, controller 30 is employed to analyze the data sample sets 55.

In step 150, a plurality of quantified values is determined. Each of the fundamental frequency peaks is defined by several frequency domain values 65 including a frequency domain value corresponding to a maximum magnitude of each peak. The frequency domain values defining the maximum magnitude of each fundamental frequency peak are located in region 67 which is indentified in broken lines. In this example embodiment, each quantified value is determined by the maximum magnitude of each fundamental frequency peak. As shown in FIG. 6, each fundamental frequency peak is characterized by a different maximum magnitude and a different spatial frequency value corresponding to the maximum magnitude. In this example embodiment, the fundamental frequency of a given one of the fundamental frequency peaks corresponds to the spatial frequency value associated with the maximum magnitude of the peak. In this example embodiment, the fundamental frequency associated with each spatial frequency peak corresponds to a spatial frequency value that is representative of the first spatial frequency of the regular pattern of radiation beams 21. Accordingly, a different spatial frequency value is associated with each of the quantified values. It must now be determined which of these spatial frequency values is best representative of the actual first spatial frequency of the regular pattern of radiation beams 21.

In step 160, a first quantified value is selected from the plurality of quantified values. In this example embodiment, the selected first quantified value is the maximum of the plurality of the quantified values. In this example embodiment, the selected first quantified value corresponds to the one of the frequency domain values having the largest magnitude. In this example embodiment, each quantified values is represented by a maximum magnitude of a different one of the fundamental frequency peaks, and the first quantified value corresponds to the fundamental frequency peak having the greatest magnitude. In this example embodiment, the first quantified value is represented by the maximum magnitude of fundamental frequency peak 66C.

As previously stated, the data samples analyzed in the frequency domain are finite and therefore are separated into finite frequency bins. If a particular targeted frequency fits perfectly into a bin, a frequency value comprising a maximum magnitude will be generated. If the targeted frequency is not so aligned, deviations in the strength of the magnitude will arise. A frequency value comprising a maximum magnitude can be achieved when "ideal" sampling conditions exist such that a first integer multiple of the sampling spatial frequency employed by sensor 54 during the sampling is equal to a second integer multiple of the spatial frequency of the elements in the regular pattern. In this context, the "integer multiple of a value" can include integer multiples of the value that are equal to the value or greater. Alternatively, a frequency value comprising a maximum magnitude can be achieved when a product of a first non-zero integer number of data samples within a given one of the data sample sets 55 and the sampling spatial period of sensor 54 is equal to a product of a second non-zero integer number and the spatial period of the of the elements in the regular pattern. Accordingly, in various example embodiments of the present invention, the number of data samples employed in each of the data sample sets 55 is varied. An analysis of each of the data sample sets 55 in the frequency domain will produce frequency peaks of varying magnitudes. The data sample set 55 corresponding to the frequency peak having the largest magnitude is deemed best representative of the actual spatial frequency of the elements in the regular pattern.

In step 170 a dimension of the regular pattern is determined based at least on the spatial frequency value associated with the selected first quantified value. In the example embodiment illustrated in FIG. 6, a spatial frequency value of approximately 23.625 $mm^{-1}$ is associated with the fundamental frequency peak having the greatest maximum magnitude (i.e. fundamental frequency peak 66C). This spatial frequency value best matches the first spatial frequency of the regular pattern of radiation beams 21. In this regard, various dimensions associated with regular pattern can be ascertained from the spatial frequency value associated with the selected first quantified value. For example, the pitch or spatial period of the radiation beams 21 in the regular pattern is equal to the inverse of the spatial frequency value associated with the selected first quantified value. The distance between various ones of the radiation beams 21 in the regular pattern can also be determined. For example, the regular pattern can include a plurality of consecutive radiation beams 21 numbering M and the first spatial frequency can be used to determine a distance extending between a first radiation beam 21 in the pattern and the $M^{th}$ radiation beam 21 in the pattern. In this example embodiment, a nominal size of the radiation beams 21 can also be determined since the pitch of the radiation beams 21 in the regular pattern is equal to the combined width of two (2) of the radiation beams 21. Further, an overall size or width of a sub-image 50 that can be produced by recording head 16 can be accurately ascertained from the determined pitch of the pattern of radiation beams 21 and the total number of radiation beams 21 that are employed to form the sub-image 50. Advantageously, the accurate determination of a size of a sub-image 50 in accordance with various aspects of the present invention can be used to reduce occurrences of undesired gaps or overlaps between merged sub-images 50. The present invention is not limited however to image forming applications and can be applied to other applications in which it is required to accurately determine the spatial frequency of elements in a regular pattern.

A program product 68 can be used by controller 30 to perform various functions as described herein. One such function can include determining a spatial frequency of elements in a regular pattern with a method or combination of methods as taught herein. Without limitation, program product 68 may comprise any medium which carries a set of computer-readable signals comprising instructions which, when executed by a computer processor, cause the computer processor to execute a method as described herein. Program product 68 may be in any of a wide variety of forms. Program product 68 can comprise, for example, physical media such as magnetic storage media including, floppy diskettes, hard disk drives, optical data storage media including CD ROMs, DVDs, electronic data storage media including ROMs, flash RAM, or the like. The instructions can optionally be compressed and/or encrypted on the medium.

The invention has been described in detail with particular reference to certain preferred embodiments thereof, but it will be understood that variations and modifications can be effected within the scope of the invention.

PARTS LIST

10 recording apparatus
12 media support
13 cylindrical surface
16 recording head
17 recording media
18 carriage
19 image
20 support
21 radiation beams
22 motion system
23 marking elements
25 registration features
28 clamps
30 controller
32 guide system
33 transmission member
37 image data
45 image element
50 sub-image
50A sub-image
52 image element columns
54 sensor
55 data sample sets
56 merge line
58 region
60 intensity profile
62 fundamental frequency peak
64 harmonic peak
65A frequency domain value
65B frequency domain value
65C frequency domain value
65D frequency domain value
65E frequency domain value
66A fundamental frequency peak
66B fundamental frequency peak
66C fundamental frequency peak
66D fundamental frequency peak
66E fundamental frequency peak
67 region
68 program product
100 method
110 provide a regular pattern of elements
120 sample the regular pattern of elements with a sensor
130 provide a plurality of data sample sets
140 analyze each data sample set to determine a corresponding spatial frequency
150 determine a plurality of quantified values
160 select a first quantified value from the plurality of quantified values
170 step
MSA main-scan axis
SSA sub-scan axis
W size
P pitch

The invention claimed is:

1. A method for determining a dimension of a regular pattern of elements, wherein the elements in the regular pattern are arranged along an arrangement direction with a first spatial frequency, the method comprising:

providing a sensor for sampling the regular pattern;

providing a plurality of data sample sets, wherein each data sample set comprises data samples provided by the sensor while sampling over a portion of the regular pattern, and each data sample set consists of a different number of data samples;

analyzing each data sample set to determine a corresponding spatial frequency;

determining a plurality of quantified values, each quantified value being associated with a different one of the determined spatial frequencies;

selecting a first quantified value from the plurality of quantified values; and determining the dimension based at least on the selected first quantified value.

2. The method according to claim 1, wherein the selected first quantified value is a maximum of the plurality of quantified values.

3. The method according to claim 1, comprising operating the sensor to perform multiple samplings of the regular pattern, wherein each data sample set comprises data samples selected from a single one of the multiple samplings and each data sample set is associated with a different one of the multiple samplings.

4. The method according to claim 1, wherein each data sample set comprises data samples selected from a first plurality of data samples provided by the sensor during a single sampling of the portion of the regular pattern.

5. The method according to claim 4, wherein each of at least one of the data sample sets comprises a portion of the first plurality of data samples, wherein the portion of the first plurality of data samples is less than a total of the first plurality of data samples.

6. The method according to claim 4, wherein at least two of the data sample sets each comprises a different number of the data samples that are selected from the first plurality of data samples.

7. The method according to claim 1, comprising operating the sensor to provide one or more data samples while sampling over a region that is adjacent to the regular pattern, and wherein at least one of the data sample sets comprises a portion of the one or more data samples.

8. The method according to claim 1, comprising operating the sensor to provide one or more data samples while sampling over a region that excludes the regular pattern, and wherein at least one of the data sample sets comprises a portion of the one or more data samples.

9. The method according to claim 1, wherein a first data sample set of the plurality of data sample sets is provided by adding additional data to data samples selected from a first plurality of data samples provided by the sensor during a single sampling of the portion of the regular pattern.

10. The method according to claim 9, wherein the additional data comprises data representing a region between two adjacent elements in the regular pattern.

11. The method according to claim 9, comprising identifying a data sample within the data samples selected from the first plurality of data samples, wherein the additional data is selected to be identical to the identified data sample.

12. The method according to claim 11, wherein the identified data sample is one of a first data sample taken by the sensor while sampling over the portion of the regular pattern and a last data sample taken by the sensor while sampling over the portion of the regular pattern.

13. The method according to claim 1, wherein the dimension is determined based at least on the spatial frequency associated with the selected first quantified value.

14. The method according to claim 13, wherein the dimension is a spatial pitch of the elements in the regular pattern.

15. The method according to claim 13, wherein the dimension is a size along the arrangement direction of one or more of the elements.

16. The method according to claim 13, comprising operating a recording head comprising a plurality of individually addressable marking elements to provide an arrangement of radiation beams, wherein the regular pattern of elements is provided by the arrangement of radiation beams.

17. The method according to claim 16, wherein the dimension is a spatial pitch of the radiation beams in the arrangement of radiation beams, and the method further comprises employing the recording head to provide a plurality of radiation beams to form a sub-image, wherein a size of the sub-image is determined based at least on the determined spatial pitch and a total number of radiation beams in the plurality of radiation beams.

18. The method according to claim 13, wherein the regular pattern of elements is provided on a surface.

19. The method according to claim 1, comprising analyzing each of the data sample sets using a Fourier Series to determine the quantified value associated with the spatial frequency determined for each data sample set.

20. The method according to claim 1, comprising analyzing each of the data sample sets in a frequency domain to determine a fundamental frequency peak for each data sample set, wherein each quantified value is determined based at least on a maximum magnitude of the fundamental frequency peak associated with a corresponding one of the data sample sets.

21. The method according to claim 1, comprising analyzing each of the data sample sets in a frequency domain to determine a harmonic frequency peak for each data sample set, wherein each quantified value is determined based at least on a maximum magnitude of the harmonic frequency peak associated with a corresponding one of the data sample sets.

22. The method according to claim 1, wherein each of at least one of the data sample sets comprises data samples provided by the sensor while sampling over a portion of each element in the regular pattern.

23. A method for determining a dimension of a regular pattern of elements, wherein the elements in the regular pattern are arranged along an arrangement direction in accordance with a first spatial frequency, the method comprising:

providing a sensor for sampling the regular pattern;

operating the sensor to provide a first plurality of data samples while sampling over a portion of the regular pattern;

providing a plurality of data sample sets, wherein each data sample set consists of a different number of data samples and each data sample set comprises data samples selected from the first plurality of data samples;

analyzing each of the data sample sets in a frequency domain to determine a corresponding spatial frequency value representative of the first spatial frequency;

determining a plurality of quantified values, wherein each quantified values is associated with one of the spatial frequency values;

selecting a first quantified value from the plurality of quantified values; and determining the dimension based at least on the spatial frequency value associated with the selected first quantified value.

24. The method according to claim 23, wherein the selected first quantified value is a maximum of the plurality of quantified values.

25. The method according to claim 23, comprising using a Fourier Series to analyze each of the data sample sets in the frequency domain.

26. The method according to claim 23, comprising analyzing each of the data sample sets in the frequency domain to determine a fundamental frequency peak for each data sample set, wherein each quantified value is equal to a maximum magnitude of the fundamental frequency peak associated with a corresponding one of the data sample sets.

27. The method according to claim 23, comprising analyzing each of the data sample sets in the frequency domain to determine a harmonic frequency peak for each data sample set, wherein each quantified value is equal to a maximum magnitude of the harmonic frequency peak associated with a corresponding one of the data sample sets.

28. The method according to claim 23, wherein each of at least one of the data sample sets comprises of a portion of the first plurality of data samples, wherein the portion of the first plurality of data samples is less than a total of the first plurality of data samples.

29. The method according to claim 23, wherein at least two of the data sample sets each comprises a different number of the data samples that are selected from the first plurality of data samples.

30. The method according to claim 23, comprising operating the sensor to provide one or more data samples while sampling over a region that excludes the regular pattern, wherein at least one of the data sample sets comprises a portion of the one or more data samples.

31. The method according to claim 23, comprising providing a first data sample set by adding additional data to the data samples selected from the first plurality of data samples for the first data sample set.

32. The method according to claim 23, comprising identifying a data sample within the data samples selected from the first plurality of data samples for a first data sample set, and adding additional data to the first data sample set, wherein the additional data is selected to be identical to the identified data sample.

33. The method according to claim 23, wherein the dimension is a spatial pitch of the elements in the regular pattern.

34. The method according to claim 23, wherein the dimension is a size along the arrangement direction of one or more of the elements.

35. The method according to claim 23, wherein the first plurality of data samples is provided by the sensor during a single sampling of the portion of the regular pattern.

* * * * *